United States Patent [19]

Midouhas

[11] 4,284,064
[45] Aug. 18, 1981

[54] SOLAR HEATING SYSTEM

[76] Inventor: Stephen C. Midouhas, 127 W. Kimberly Ave., Brant Beach, N.J. 08008

[21] Appl. No.: 964,157

[22] Filed: Nov. 28, 1978

Related U.S. Application Data

[63] Continuation-in-part of Ser. No. 831,473, Sep. 8, 1977, abandoned.

[51] Int. Cl.³ .............................................. F24J 3/02
[52] U.S. Cl. ................... 126/429; 126/449; 126/450
[58] Field of Search ............... 126/449, 450, 901, 429, 126/437

[56] References Cited

U.S. PATENT DOCUMENTS

| | | | |
|---|---|---|---|
| 1,801,710 | 4/1931 | Abbot | 126/441 |
| 3,145,707 | 8/1964 | Thomason | 126/432 |
| 3,254,643 | 6/1966 | Thomason | 126/432 |
| 3,262,493 | 7/1966 | Hervey | 126/428 |
| 3,369,539 | 2/1968 | Thomason | 126/432 |
| 3,841,302 | 10/1974 | Falbel | 126/425 |
| 3,859,980 | 1/1975 | Crawford | 126/426 |
| 3,989,031 | 11/1976 | Thomason et al. | 126/450 |
| 4,015,586 | 4/1977 | Vroom et al. | 126/450 |
| 4,016,861 | 4/1977 | Taylor | 126/449 |
| 4,029,258 | 6/1977 | Groth | 126/429 |
| 4,037,785 | 7/1977 | Madern | 126/437 |
| 4,085,734 | 4/1978 | Gibbs | 126/450 |
| 4,090,494 | 5/1978 | Borst et al. | 126/450 |
| 4,114,595 | 9/1978 | Bakber | 126/450 |
| 4,119,083 | 10/1978 | Heyen et al. | 126/450 |
| 4,123,883 | 11/1978 | Barber et al. | 126/901 |
| 4,136,669 | 1/1979 | Lane | 126/450 |
| 4,144,874 | 3/1979 | Zebuhr | 126/450 |
| 4,175,542 | 11/1979 | Duchene | 126/437 |

FOREIGN PATENT DOCUMENTS 2718302  10/1978  Fed. Rep. of Germany ........... 126/450

Primary Examiner—Daniel J. O'Connor
Attorney, Agent, or Firm—Zachary T. Wobensmith, 2nd; Zachary T. Wobensmith, III

[57] ABSTRACT

A solar heating system is described which includes solar heat collectors mounted on the roof or side of a building facing toward the sun with air in contact therewith for heating, which air is circulated through ducts in a heat storage unit, the air flow being controlled by a differential thermostat which provides heated air to the storage unit so long as the temperature of the air in the heat collectors is a few degress above that of the storage unit. The heat storage unit has ducts therein communicating with the interior of a building but separate from the ducts attached to the collectors for transferring stored heat from the storage unit to air to be circulated within the building. The air circulation within the building is controlled by a thermostat attached to a blower and to a source of auxiliary heat when the temperature in the storage unit is below a predetermined level. The storage unit may have a pipe loop passing therethrough for pre-heating the water for a domestic hot water heater.

The solar heat collectors each include a backing sheet or wall, such as masonite, with a plurality of finned metal heat absorbers attached thereto, and with a transparent cover thereover, the collectors being mounted to the exterior of the building by retainers attached by lag bolts to roof beams or rafters or to exterior rafters replacing the roof covering or the exterior wall covering.

13 Claims, 13 Drawing Figures

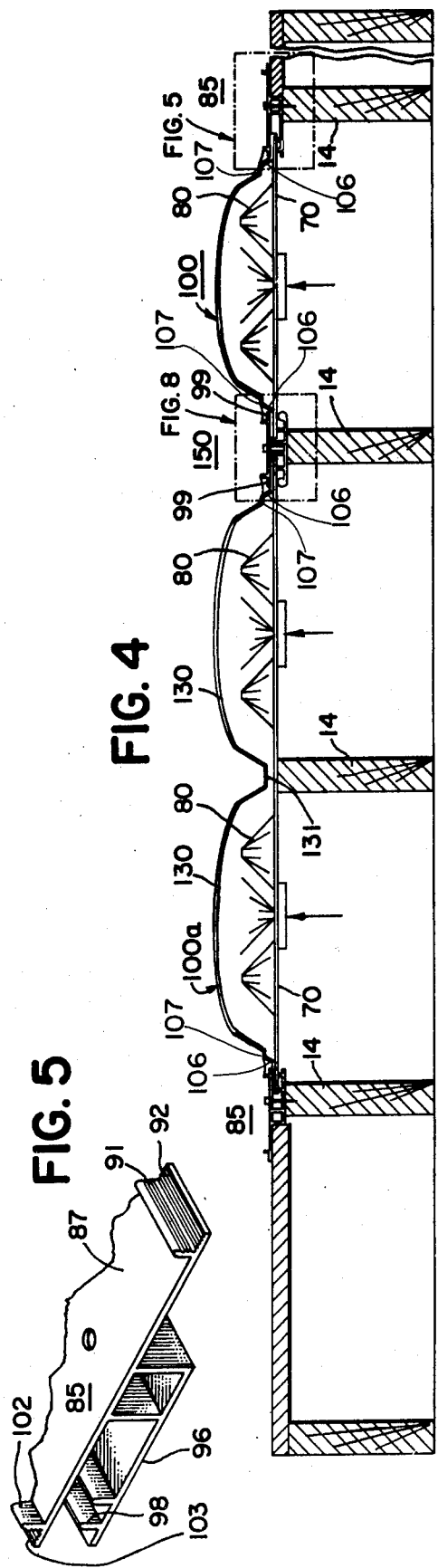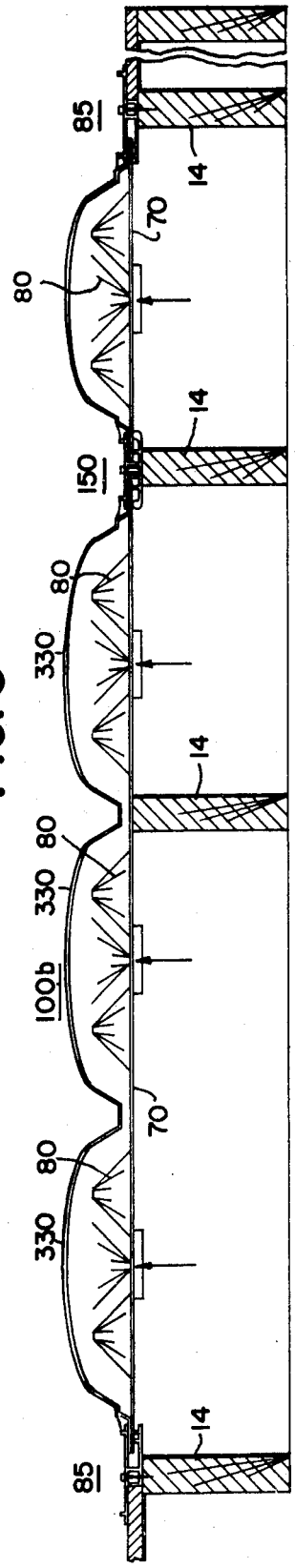

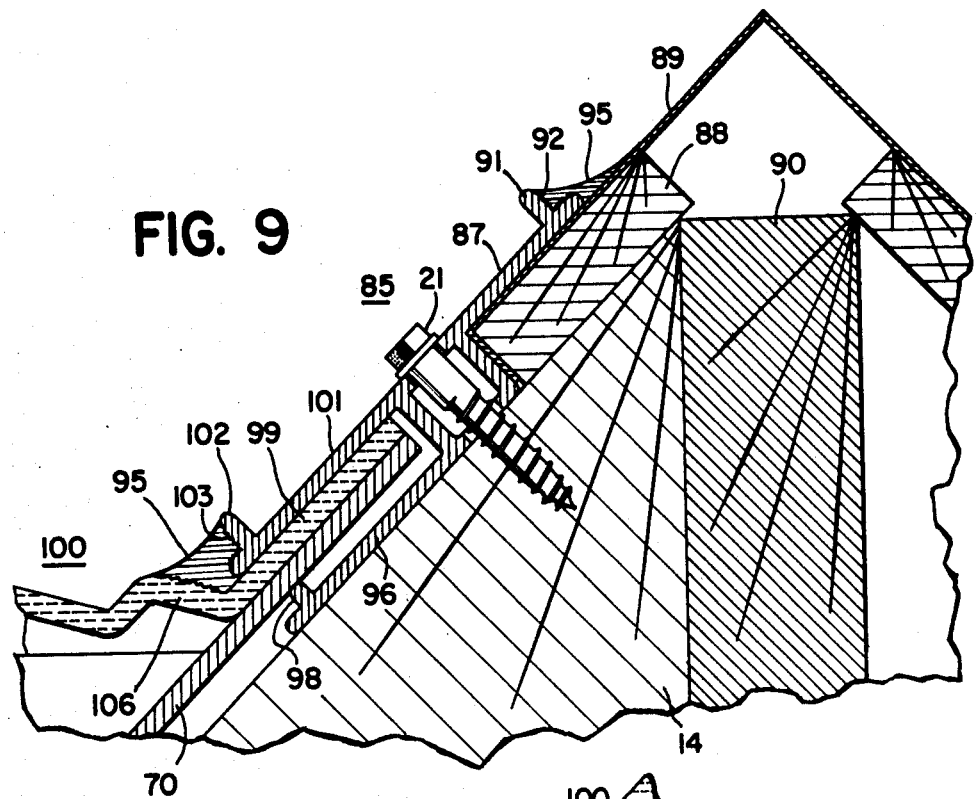
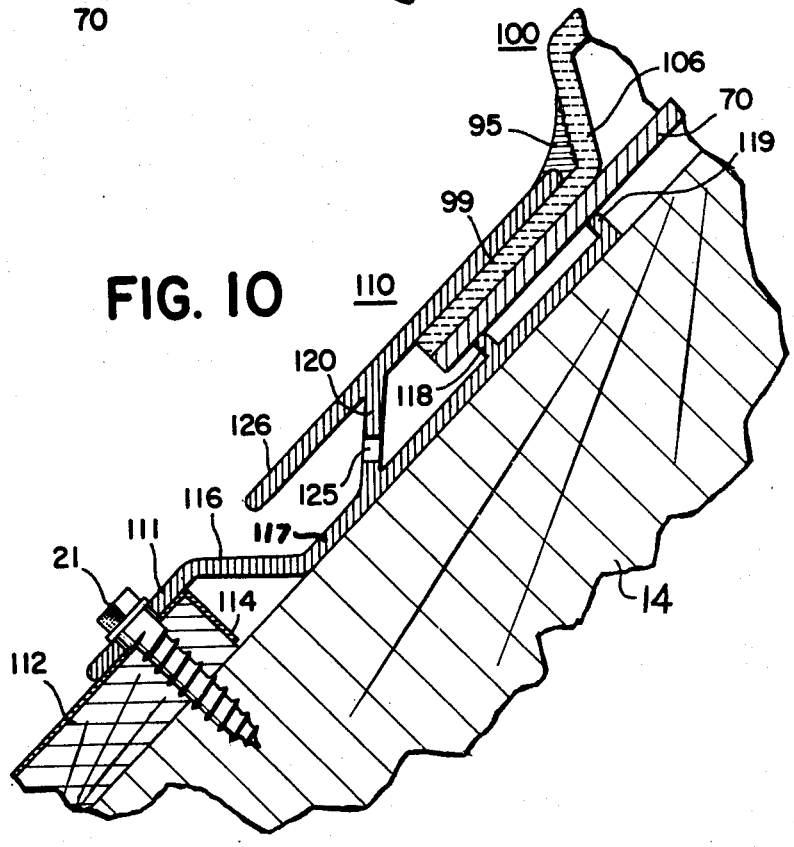

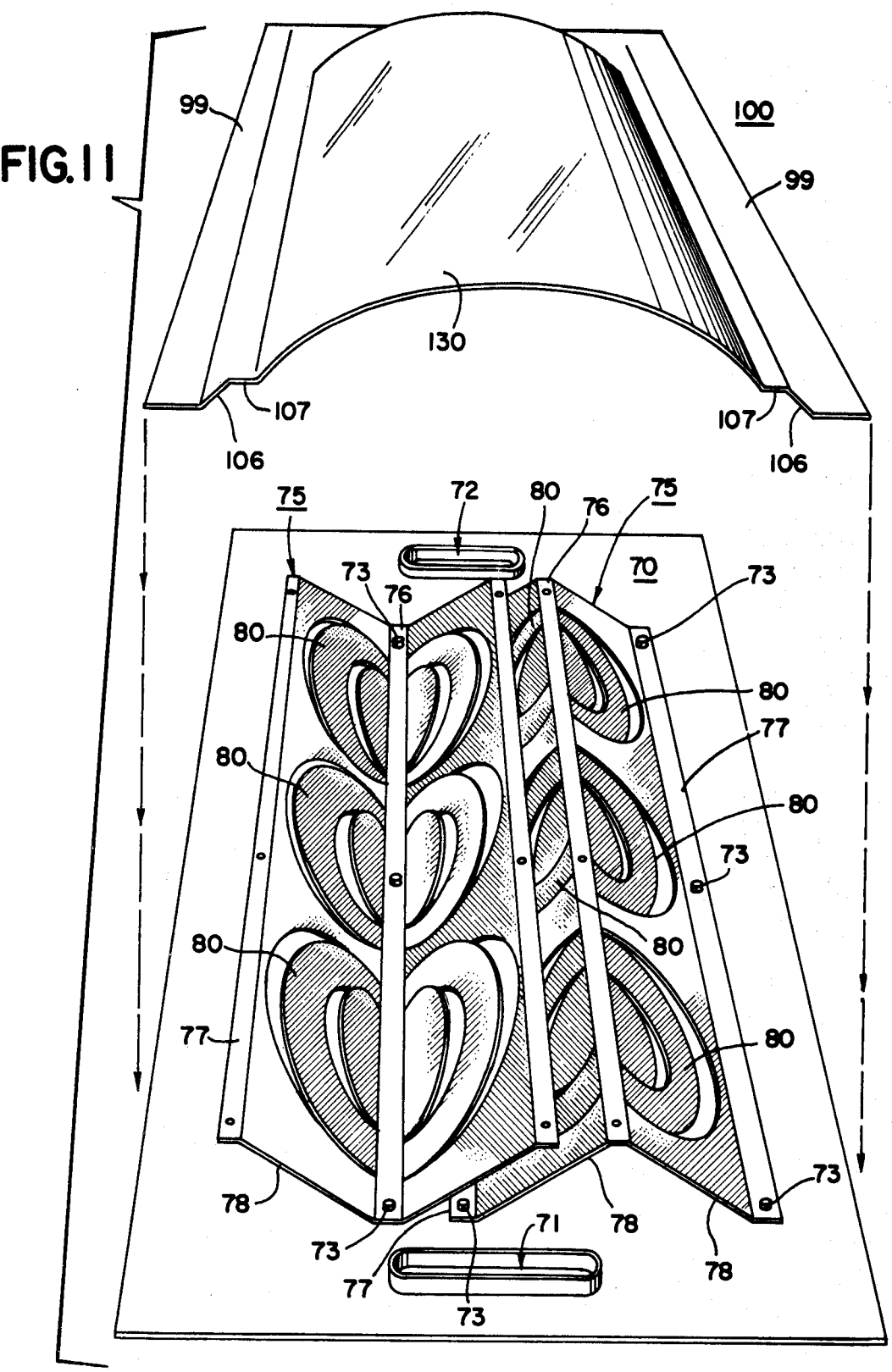

SOLAR HEATING SYSTEM

CROSS REFERENCE TO RELATED APPLICATIONS

This application is a continuation in part application of my prior pending application Ser. No. 831,473, filed Sept. 8, 1977, now abandonded.

BACKGROUND OF THE INVENTION

1. Field of the Invention

This invention relates to a solar heating system for a building of the type which uses air as a heat transfer medium and includes heat collectors with a plurality of covered finned metal heat absorbers over which flows air to be heated and which replace a portion of the roof covering or exterior wall covering.

2. Description of the Prior Art

There have been a considerable number of heating systems proposed that are designed to capture the energy in the sun's rays as a source of heat for a building.

The U.S. Pat. No. 1,801,710, to Abbot, shows an apparatus which includes two sheets of dark coated metal for receiving the sun's rays and with a plurality of oval glass tubes as a cover which permit the sun's rays to pass therethrough but do not readily permit the rays from the metal sheets to be reflected back out.

The U.S. Pat. No. 3,145,707, to Thomason, shows a solar heat collector which includes a box with a transparent protective cover, a layer of insulation on the interior bottom of the box covered by a layer of reflecting foil and a heat collecting sheet with an irregular and blackened upper surface. The heat collecting sheet is covered with a second transparent cover intermediate the sheet and protective cover, is flexible and droops against the heat collecting sheet. Heat absorbing fluid passes between the sheets, and picks up and transfers the heat to the building to be heated.

The U.S. Pat. No. 3,254,643, to Thomason, illustrates a solar heat apparatus which includes a solar heat trap with a hinged reflective cover section 13, insulator and heat conductive corrugated sheet of metal 27 with a vapor barrier 26, supports 28 for supporting the sheet 27 above barrier 26 and transparencies such as glass 31 or plastic 29 spaced thereabove by spacers 30 providing a space for fluid to pass therethrough and absorb the heat.

The U.S. Pat. No. 3,262,493, to Hervey, illustrates a means for heating or cooling a structure which includes a solar heat collector with tubes 34 which have fluid from a heat storage coil passed therethrough for heat transfer.

The U.S. Pat. No. 3,369,539, to Thomason, illustrates a type of solar heat trap which has a transparent outer cover quilted at various intervals and filled with a heat collecting layer of bits of material such as dark sand or similar granular material. The cover is provided with inlets and outlets to permit the passage of heat absorbing fluid therethrough. The material filled bag may be secured to the roof or may be held thereon due to its own weight.

The U.S. Pat. No. 3,841,302, to Falbel, illustrates a solar energy system for a building which system is positioned inside the attic of a building and includes a plurality of reflective surfaces that form a pyramidal reflector which focus the sun's rays on a collector of the flat plate "block" type of collector, and which has a liquid medium such as water in contact therewith which can be used to transfer heat to the inside of the building.

The U.S. Pat. No. 3,859,980, to Crawford, illustrates a solar heating unit which consists of a plurality of tubes in parallel relation connected at their ends to manifolds, with a transparent envelope surrounding the tubes and with a pump to circulate heat absorbing fluid through the tubes for heat transfer to the location to be heated.

The U.S. Pat. No. 4,016,861, to Taylor, shows a solar heat collector which includes a top plate with spaced downwardly extending tabs, a bottom plate with spaced upwardly extending tabs, over which air is circulated and to a heat storage unit. The Taylor structure is unduly complicated with the tab design interfering with the sunlight passage for absorption, does not provide for secure retention of the collector components, is not intended to replace the roof or exterior sheathing on a building and suffers from other shortcomings.

The U.S. Pat. No. 4,029,258, to Groth, shows a solar energy collector with a metal collector plate mounted in a heat insulated space below a dual pane transparent member, air being circulated in the space and to a heat storage unit. The structure of Groth is not suitable for use as a substitute for the roof covering or the exterior wall covering of a building, does not provide the greater surface area of my structure and suffers from other shortcomings.

None of these structures is wholly satisfactory. Those that use a fluid other than air require expensive leak-proof piping and an additional heat exchanger inside the building. In addition, none of the structures is easily installed on the exterior of a building and directly thereto and provided with a solar heat collector of sufficient heat input capacity to make the system economically practical for use.

The solar heating system of my invention is readily installed on any new or existing building, uses air as a transfer medium, is provided with solar heat collectors of greater efficiency than those previously available, and includes a heat storage unit which may also pre-heat water for a domestic hot water heater.

SUMMARY OF THE INVENTION

In accordance with the invention, a solar heating system is provided which includes solar heat collectors for mounting on a building, the collectors including a backing to which are mounted a plurality of finned metal heat absorbers with a transparent cover secured to the backing by retainers with which the backing is also engaged, and which retainers are bolted directly to roof beams or rafters or to other exterior rafters of the building. Ductwork communicates with the solar heat collectors and a heat storage unit with air flow therethrough being controlled by a differential thermostat. Air flow to the structure to be heated passes through the storage unit, separate from the air flow to the solar heat collectors and is controlled by a thermostat, with provisions for auxiliary heat supply in the event that the heat stored in the storage unit is insufficient to heat the structure. A pipe loop may also pass through the storage unit to pre-heat water for a domestic hot water heater.

The principal object of the invention is to provide a solar heating system which includes a solar heat collector of high efficiency and which uses air as a heat transfer medium.

A further object of the invention is to provide a solar heating system which has a solar heat collector of low profile but high exposure.

A further object of the invention is to provide a solar heating system which is easily and quickly installed on any new or existing structure, as a replacement for the roof or other exterior covering of the structure.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which:

FIG. 4 is a sectional view taken approximately on the line 4—4 of FIG. 3 illustrating one type of cover for the solar heat collector;

FIG. 5 is a fragmentary perspective view of a portion of a truss member for the solar heat collector and is taken at the location 5 of FIG. 4;

FIG. 6 is a view similar to FIG. 4 but illustrating another type of cover for the solar heat collector;

FIG. 9 is a fragmentary sectional view similar to FIG. 8 but illustrating the form of retainer used at the top of the solar heat collector near the ridge beam of the structure;

FIG. 10 is a fragmentary sectional view similar to FIG. 9 but illustrating the retainer used at the bottom of the solar heat collector; and FIG. 11 is an exploded perspective view illustrating a portion of the solar heat collector of the invention.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Figure 1:
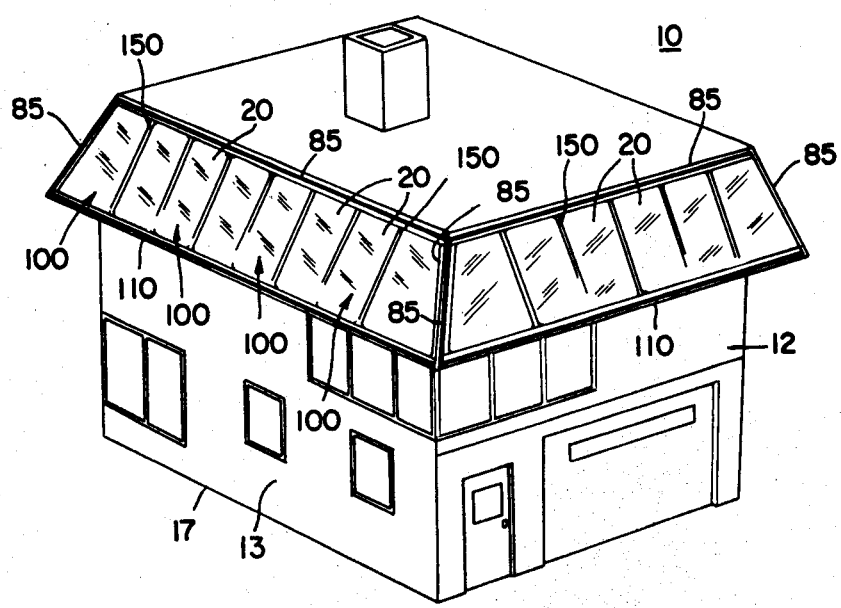
FIG. 1 is a view in perspective of a structure incorporating one embodiment of the solar heating system of my invention.
Figure 2:
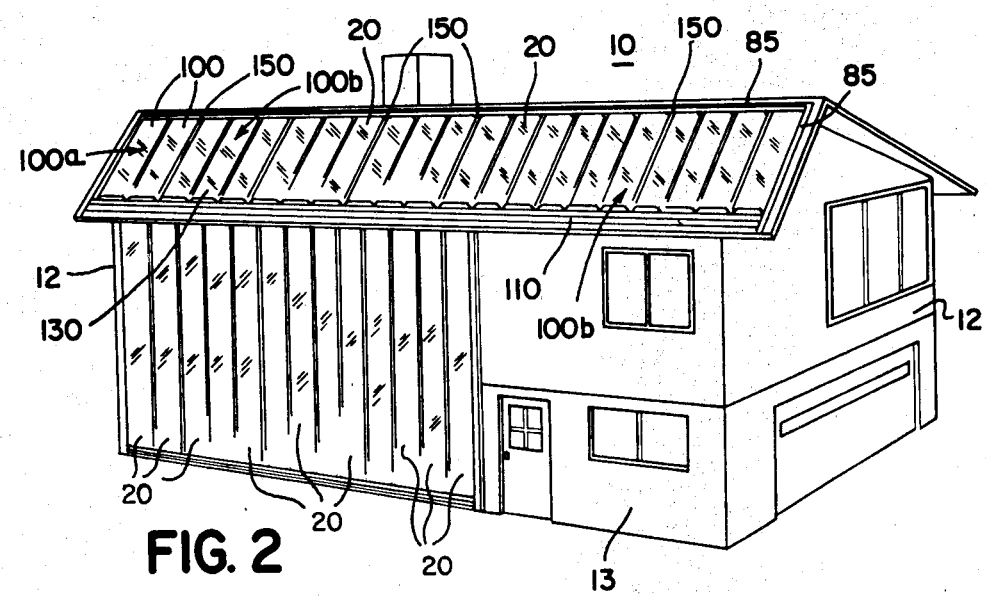
FIG. 2 is a view similar to FIG. 1 but illustrating another embodiment of the solar heating system of my invention.
Figure 3:
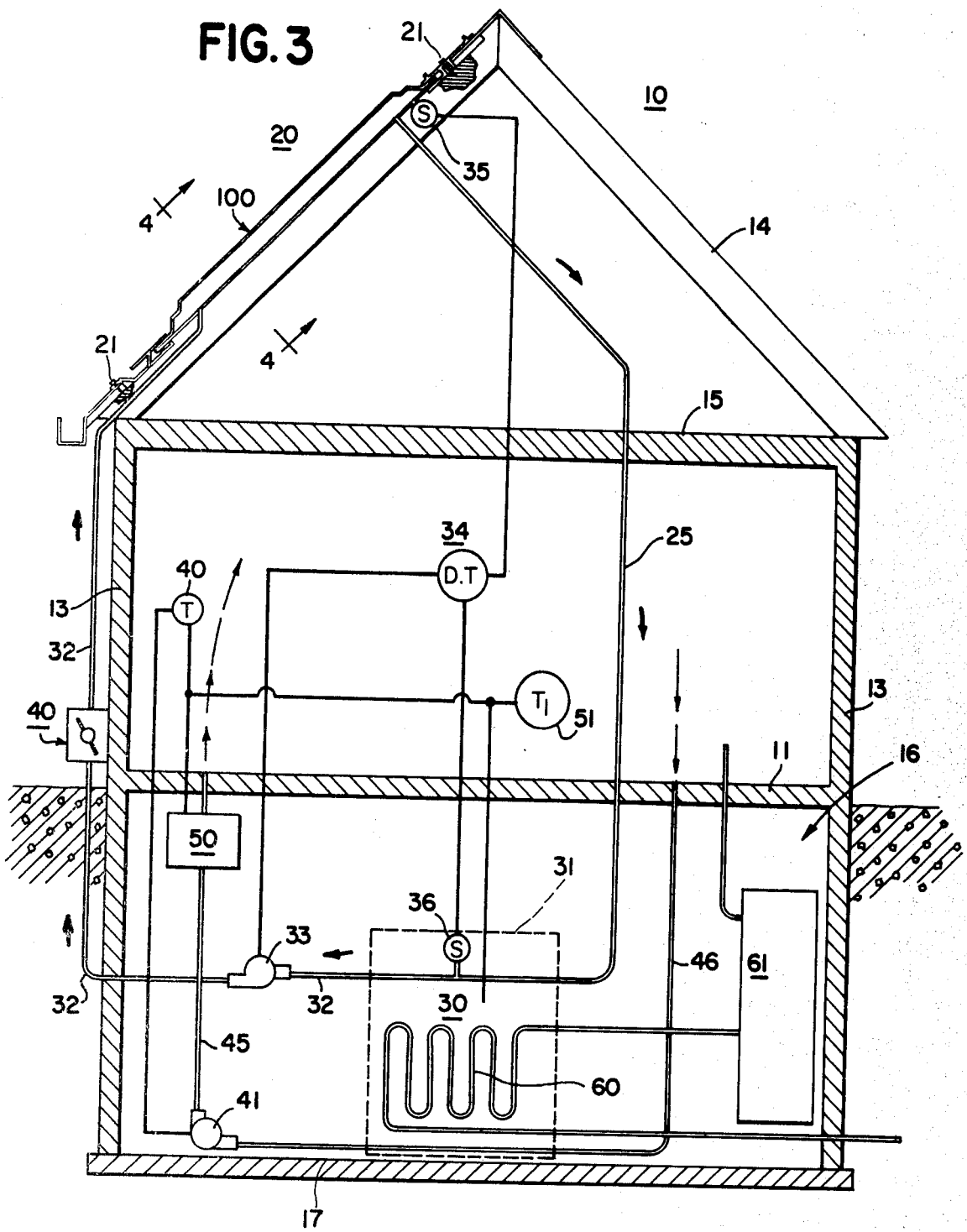
FIG. 3 is a side elevational view, partly diagrammatic, of a structure incorporating the solar heating system of my invention.

Referring now more particularly to the drawings and FIGS. 1, 2, and 3 thereof, a structure 10 is illustrated which includes a floor 11, side wall 12, front and rear walls 13, roof rafters 14, tie rafters 15, and basement 16 with floor 17.

One form of solar heat collector 20 is illustrated in FIG. 3 as mounted to roof rafters 14 by lag bolts 21 with a heat output duct 25 connected thereto and passing through floor 11 and into a heat storage unit 30 in the basement 16.

The storage unit 30 includes an outer insulating cover 31 and a filler material such as sand or other granular material (not shown) which absorbs heat. The storage unit 30 has a return duct 32 connected to a blower 33 and to collector 20. The blower 33 is controlled by a differential thermostat 34 which is connected to a sensor 35 in collector 20 and a sensor 36 in storage unit 30. The thermostat 34 measures the temperature differential between the storage unit 30 and heat collector 20 to permit air to flow between the collector 20 and storage unit 30 only when the air temperature in the collector 20 is a few degrees above that of the storage unit 30. A spring loaded damper 40 is also located in the return duct 32 and acts to prevent backflow of air in the duct 32 from the collector 20.

The temperature of the air to be circulated within the building 10 is controlled by a conventional thermostat 40 which turns a forced air blower 41 on or off. The blower 41 is connected to a heat output duct 45 connected to the heat storage unit 30 which duct is separate from and does not communicate with the air flow ducts between the storage unit 30 and collector 20. Return air flows into storage unit 30 from the space in the interior of the structure 10 through return duct 46. The thermostat 40 is also connected to a source 50 of auxiliary heat, which may be an electric resistance heater and which is connected to a circuit with a second thermostat 51 which measures the temperature in the storage unit 30 to determine whether or not the heat source 50 is to be activated.

A pipe loop 60 is provided attached to an input cold water supply (not shown) extending into the heat storage unit 30 and its output is connected to a domestic hot water heater 61 in heat exchange relation so as to preheat the water before it passes into the heater 61.

Referring now to FIGS. 4, 5, 7, an 8 to 11, the solar heat collector 20 there shown includes a backing sheet 70 preferably of masonite or other dense material which has good insulating qualities and provides a firm support surface.

Figures 7A, 7B, 7C:
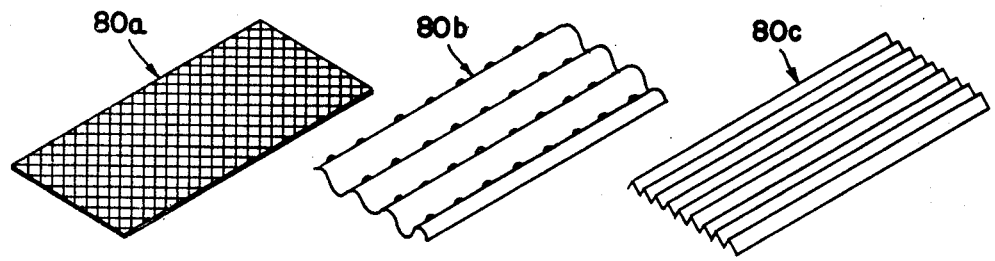
FIGS. 7A, 7B, and 7C are perspective views illustrating three variations of a portion of the heat collector structure.

The backing 70 is illustrated as being of rectangular shape in sheet form with air inlet openings 71 and air outlet openings 72. A plurality of heat absorbing members 75 are provided preferably attached to backing 70 by screws 73 and include a central longitudinal rib 76 and side longitudinal ribs 77. The ribs 76 and 77 are in parallel relation and connected by plates 78 at an angle to the plane of ribs 76 and 77 which angle may be of the order of 15°. The plates 78 have cut out portions 80 spaced therealong which in the embodiment illustrated in FIG. 11 are circular and as shown in FIGS. 7A, 7B, and 7C can be corrugated as at 80c, corrugated with dimples as at 80b, or of a waffle pattern as at 80a. The cut out portions 80 are bent upwardly from the plates 78 for air flow, and in the interiors of the cut out portions 80 a cnetral opening 80' is provided with plate portions 80" which are preferably bent upwardly to a further extent to permit of air circulation at the opening 80'. The selection of the particular plate to use is dependent on the gauge of the material utilized and its heat transfer characteristics.

In the preferred embodiment of FIG. 11, the members 75 are preferably constructed of sheet aluminium which can have the configurations therein relatively easily formed by striking out in a punch press or other metal forming machine.

The backing 70 is shown in FIG. 9 as engaged in a retainer 85 which extends along the roof near the top thereof, spans roof rafters 14 and is secured thereto by lag bolts 21. The retaineer 85 has one portion 87 of L-shape shown at the top in FIG. 9 which engages a plywood strip 88 with a sheet of flashing 89 therebetween, which flashing 89 extends over a ridge beam 90 to which the rafters 14 are secured in conventional manner.

The L-shaped portion 87 has a longitudinal perpendicular plate 91 extending therealong with a serrated edge 92, against which a sealant 95 such as tar is placed to prevent water infiltration between the flashing 89 and L-shaped portion 87. The retainer 85 has a portion 96, shown at the bottom in FIG. 9, with a plate 98 extending perpendicularly upwardly therefrom a short distance and engaged with a backing sheet 70. The backing sheet 70 has the edge rib 99 of a transparent synthetic plastic dome shaped cover 100 adjacent the top thereof and retained between it and a portion 101 of retainer 85, which is contiguous to portion 87 and has a longitudinal plate 102 extending therealong. The plate 102 has a serrated edge 103 and sealant 95 engaged therewith and with the rib 99 of cover 100. The sealant 95 is also engaged with an angularly related portion 106 of cover 100 extending from rib 99.

Figure 8:
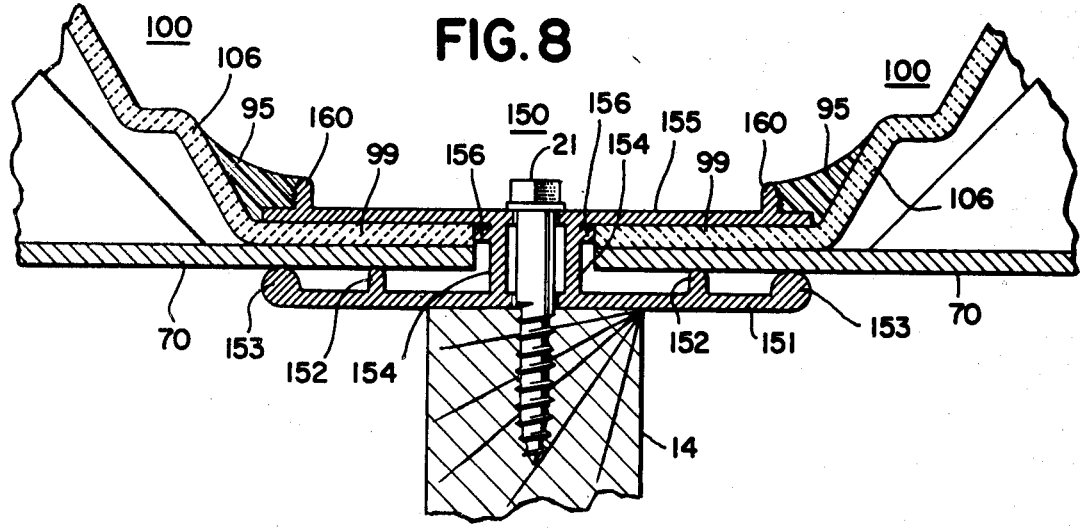
FIG. 8 is a view taken at location 8 of FIG. 4, enlarged, illustrating one form of one piece retainer for mounting the heat collector structure on the rafters of a building.

Referring now to FIGS. 8, 9 and 10 an intermediate retainer 150 is illustrated of one piece construction and which has lag bolts 21 engaged therewith and with a roof rafter 14. The retainer 150 runs along a roof rafter 14 from retainer 110 at the bottom of the roof to retainer 85 at the top. The retainer 150 includes a bottom plate 151 with spaced upwardly extending rib-like projections 152 and 153 extending therealong with backings 70 in contact therewith. Side ribs 99 of covers 100 are engaged with the backings 70 and retained in engagement by top plate 155 which is connected to bottom plate 151 by plates 154. The covers 100 have their edge ribs 99 engaged by guide ribs 156 extending from plates 154.

The covers 100 have upwardly inclined portions 106 from ribs 99 and the top plate 155 has its serrated edge ribs 160 extending upwardly therefrom. Sealant 95 is engaged with the cover portions 99, 106, ribs 160 and plates 155 to prevent access of water therebetween.

Referring now to FIG. 10, the retainer 110 extends above and along the bottom edge of roof rafters 14 and includes a top plate 111 with lag bolts 21 therethrough engaged in a strip of plywood 112 and roof rafters 14 with a sheet of flashing 114 therebetween.

The retainer 110 has a plate 116 engaged with plate 111 angled toward rafters 14 and attached to plate 117 which has two short plates 118 and 119 extending perpendicularly upwardly therefrom engaged with and supporting a sheet of backing 70. A plate 120 extends upwardly and angularly to plate 117 between plates 118 and 111 with a weep hole 125 therein to permit the escape of moisture. The plate 120 is attached to a flat top plate 126 which overlaps plate 111 and also acts as a rain shield. The plate 126 extends over the backing 70 and rib 99 of cover 100 to the end of and adjacent plate 119 retaining the rib 99 and backing 70 therebetween. Sealant 95 is provided engaging plate 126 and portion 106 of cover 100.

In FIG. 2, the heat collectors 20 are also shown as attached to the side 13 of the structure as well as being attached to the roof which configuration is optional depending on the desire of the user and the exposure of the structure to sunlight.

In FIG. 1, the heat collectors 20 are shown with a single transparent domed cover 100 which is mounted to the roof of the structure and which is suitable for structures having a large enough roof area to provide sufficient sunlight exposure.

Referring now specifically to FIGS. 2, 4, and 11, the heat collector 20 has been described above and the cover 100 has been described in relation to the retainers 85 and 110. The cover 100 as illustrated in FIGS. 4 and 11 is transparent and preferably formed of thermoplastic such as acrylic plastic and heat or vacuum formed to the desired shape. The cover 100 includes a dome shaped portion 130 which is continuous with and connected to inclined portions 106, 107, and edge ribs 99.

In FIG. 4, the cover 100a is shown as having two dome shaped portions 130 which at the intersection 131 of the edge ribs 99, are continuous and preferably do not touch the backing 70 which is adjacent to a roof rafter 14.

In FIGS. 2 and 6, another preferred form of cover 100b is illustrated similar to cover 100 but having three dome shaped portions 330 between its side edges which are also continuous and do not touch backing 70 except at the edges.

It will thus be seen that structure has been provided with which the objects of the invention are attained.

I claim:

1. A solar heat collector for mounting on a portion of a building exposed to the sun comprising
   a backing member of relatively rigid insulating sheet material mounted in position on the exterior portion of the building by at least one retainer means extending through said backing member and having a lower air inlet opening therethrough and an upper air outlet opening therethrough,
   a plurality of spaced elongated finned heat absorber members mounted to said backing member and extending longitudinally along said backing member for passage of air therethrough for heating,
   cover means enclosing said backing and said heat absorber means, and
   said cover means including at least one bilaterally curved transparent dome with side marginal edges,
   said retainer means being in strip form and engaging said side marginal edges of said cover means and retaining said backing in attached relation to the exterior portion of said building,
   said retainer means including
      a bottom plate having at least one upwardly extending rib in contact with said backing,
      a top plate in engagement with the side edges of said dome retaining said backing between said dome and said backing plate,
      at least one plate connecting said top and bottom plates, and
      lag bolts engaged with said retainer and an exterior portion of said building.

2. A solar heat collector as defined in claim 1 in which
   guide ribs are provided parallel to said top and bottom plates attached to said connecting plate.

3. A solar heat collector as defined in claim 1 in which
   said retainer has a plate extending from said bottom plate at an angle therefrom and has a lag bolt therein for attachment to a portion of said building.

4. A solar heat collector as defined in claim 1 in which said collector is mounted to said building by a top retainer, an intermediate retainer and a bottom retainer.

5. A solar heat collector as defined in claim 1 in which
said heat absorber means comprises a plate having plate portions disposed at an angle to said backing,
each of said plate portions having openings with interior plate portions at an angle to said first mentioned plate portions for air circulation through said openings.

6. A solar heat collector as defined in claim 1 in which
said heat absorber means comprises a plate having plate portions disposed at an angle to said backing,
each of said plate portions having openings with interior plate portions bent upwardly at an angle to said plate portions for air circulation through said openings.

7. A solar heat collector as defined in claim 1 in which
said heat absorber means comprises a plate having plate portions disposed at an angle to said backing,
each of said plate portions having openings with interior plate portions bent downwardly at an angle to said plate portions for air circulation through said openings.

8. A solar heat collector as defined in claim 5 in which
each of said plate portions has, interiorly of said openings, additional openings with additional interior plate portions at a different angle to said first mentioned plate.

9. A solar heat collector for mounting on a portion of a building exposed to the sun comprising
a backing member of relatively rigid insulating sheet material mounted in position on the exterior portion of the building by at least one retainer means extending through said backing member and having a lower air inlet opening therethrough and an upper air outlet opening therethrough,
a plurality of spaced heat absorber members mounted to said backing member and extending longitudinally along said backing member for passage of air therethrough for heating,
cover means enclosing said backing member and said heat absorber means, and
said cover means including at least one bilaterally curved transparent dome with side marginal edges for access of the sun to the interior,
said heat absorber means comprising a plurality of elongated strips including strips contiguous to said side marginal edges, said strips having side ribs, a central rib in a plane parallel to and spaced from said side ribs, and intermediate strips between said side ribs and said central ribs,
said intermediate strips being angularly disposed with respect to said central rib and having spaced therealong a plurality of outer and inner cutout portions, the outer cutout portions being disposed at a different angle with respect to the intermediate portions than the inner cutout portions.

10. A solar heat collector as defined in claim 9 in which
said outer and inner cutout portions are rounded.

11. A solar heat collector as defined in claim 9 in which
alternate strips are disposed with said side ribs secured to said backing member and said central rib secured to said backing member.

12. A solar heat collector as defined in claim 11 in which
said strips having said side ribs secured to said backing member have said cutout portions disposed downwardly.

13. A solar heat collector as defined in claim 11 in which
said strips having said central ribs secured to said backing member have said cutout portions disposed upwardly.

* * * * *